(12) United States Patent
Yoo

(10) Patent No.: US 9,621,506 B2
(45) Date of Patent: *Apr. 11, 2017

(54) METHOD AND APPARATUS FOR ACCESSING LOCATION BASED SERVICE

(71) Applicant: Samsung Electronics Co., Ltd., Suwon-si, Gyeonggi-do (KR)

(72) Inventor: Ji Yeon Yoo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,161

(22) Filed: Jan. 3, 2014

(65) Prior Publication Data

US 2014/0122611 A1 May 1, 2014

Related U.S. Application Data

(63) Continuation of application No. 13/558,683, filed on Jul. 26, 2012, now Pat. No. 8,649,804.

(30) Foreign Application Priority Data

Aug. 24, 2011 (KR) .................. 10-2011-0084431

(51) Int. Cl.
*H04W 24/00* (2009.01)
*H04L 12/58* (2006.01)
*H04W 4/02* (2009.01)
*H04W 4/18* (2009.01)
*H04W 4/20* (2009.01)
*H04W 8/08* (2009.01)

(52) U.S. Cl.
CPC ............ *H04L 51/32* (2013.01); *H04W 4/02* (2013.01); *H04W 4/185* (2013.01); *H04W 4/206* (2013.01); *H04W 8/08* (2013.01)

(58) Field of Classification Search
CPC .............................. H04L 51/32; H04W 8/08
USPC ........... 455/404.2, 414.1–414.4, 456.1–457, 455/550.1, 556.2
See application file for complete search history.

(56) References Cited

U.S. PATENT DOCUMENTS

| 5,889,845 A | 3/1999 | Staples et al. |
| 7,010,293 B2 | 3/2006 | Go |
| 8,073,460 B1 | 12/2011 | Scofield et al. |
| 2007/0244633 A1* | 10/2007 | Phillips et al. ............... 701/207 |
| 2008/0288573 A1 | 11/2008 | Bellotti et al. |
| 2008/0307311 A1 | 12/2008 | Eyal |
| 2010/0080163 A1* | 4/2010 | Krishnamoorthi .... H04L 12/189 370/312 |
| 2010/0114854 A1 | 5/2010 | Lee |

(Continued)

FOREIGN PATENT DOCUMENTS

| CN | 101252731 A | 8/2008 |
| JP | 2003-150846 A | 5/2003 |

(Continued)

*Primary Examiner* — Babar Sarwar
(74) *Attorney, Agent, or Firm* — Jefferson IP Law, LLP

(57) ABSTRACT

A method for providing a social network service using location information is provided. The method includes receiving at least one content, when the content includes at least one location information, extracting the at least one location information from the content, and providing the social network service using the extracted at least one location information.

12 Claims, 9 Drawing Sheets

(56) References Cited

U.S. PATENT DOCUMENTS

| | | | |
|---|---|---|---|
| 2010/0197323 A1* | 8/2010 | Freeburg | H04W 4/02 455/456.2 |
| 2010/0262928 A1 | 10/2010 | Abbott | |
| 2011/0083101 A1* | 4/2011 | Sharon et al. | 715/800 |

FOREIGN PATENT DOCUMENTS

| | | |
|---|---|---|
| KR | 10-0738686 B1 | 7/2007 |
| KR | 10-2008-0044610 A | 5/2008 |
| KR | 10-2010-0046586 A | 5/2010 |
| KR | 10-2010-0138556 A | 12/2010 |
| KR | 10-1048644 B1 | 7/2011 |
| WO | 9718662 A1 | 5/1997 |

* cited by examiner

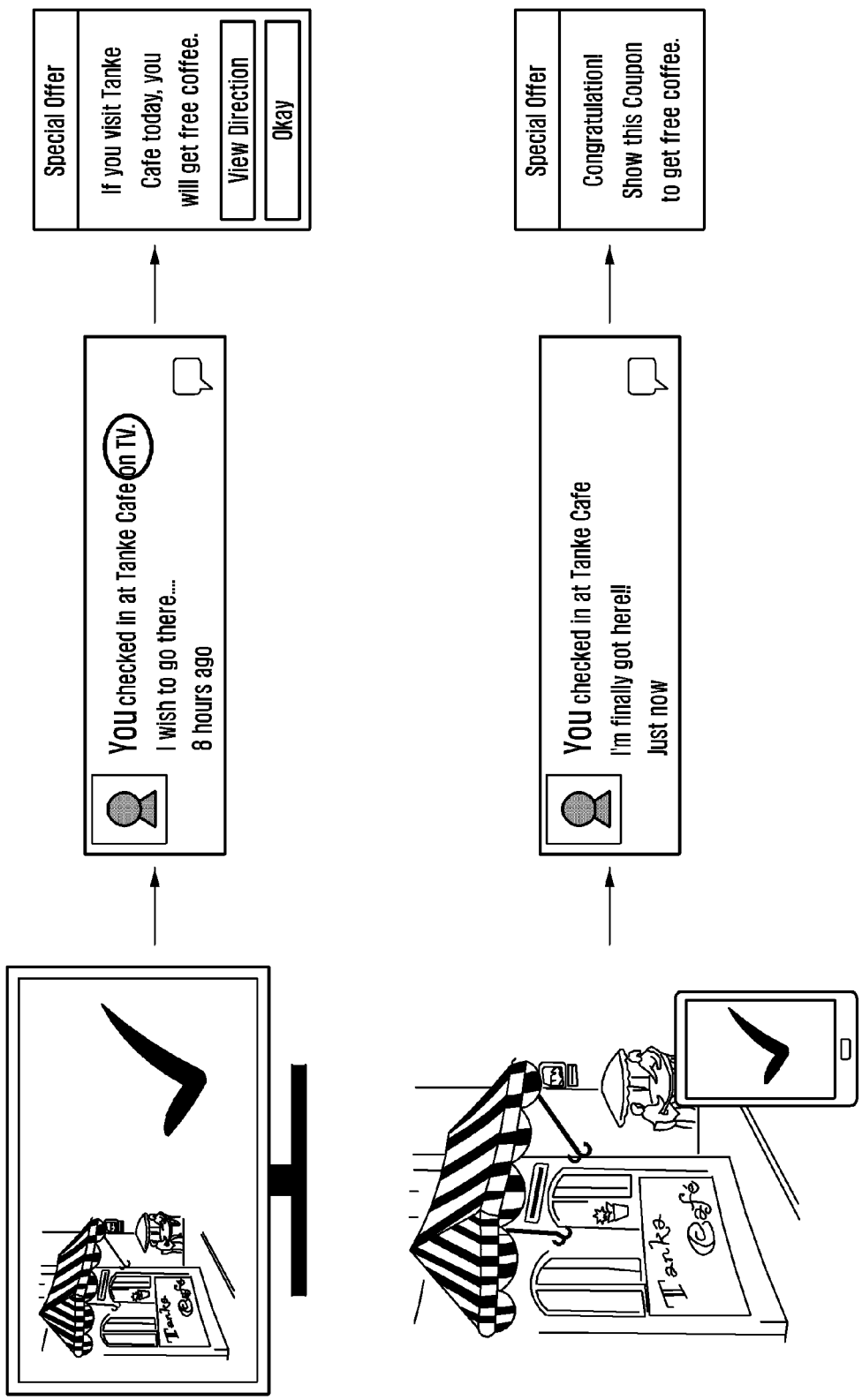

METHOD AND APPARATUS FOR ACCESSING LOCATION BASED SERVICE

PRIORITY

This application is a continuation application of U.S. patent application Ser. No. 13/558,683, filed on Jul. 26, 2012 in the U.S. Patent and Trademark Office, which claims the benefit under 35 U.S.C. §119(a) of a Korean patent application filed on Aug. 24, 2011 in the Korean Intellectual Property Office and assigned Serial No. 10-2011-0084431, the entire disclosure of which is hereby incorporated by reference.

BACKGROUND OF THE INVENTION

1. Field of the Invention

The present invention relates to a method and apparatus for accessing a location-based social network service. More particularly, the present invention relates to a method and apparatus for accessing a location-based social network service, in which the location-based social network service is available in the same manner as in using the current location information of a portable terminal using virtual access location information of the portable terminal, even though the portable terminal is not positioned in the real space.

2. Description of the Related Art

Recently, with the rapid distribution of portable terminals, a portable terminal has become a necessity. Such a portable terminal has been transformed into a multimedia communication device by providing various data transmission services and various additional services as well as a voice call service. As such, various services using a portable terminal have been developed, and a location-based service is one of such services.

A location-based service is a system that provides various services to a user based on the location information obtained through a mobile communication network and a Global Positioning System (GPS), etc. For example, when a user of a portable terminal passes by a certain place, the user can be automatically provided a service like receiving an online coupon of a nearby store.

Currently, a location-based social network service, which is a combined type of a location-based service and a social network service, is being provided. The location-based social network service is a service where the user's location is recognized using the location-based service, the location is provided to acquaintances of the user through the social network service, and the relation information can be shared. The location-based social network service establishes a platform where opinions and information can be shared with acquaintances, by which mutual communication according to the location information beyond communication simply through a bulletin board is possible, and because information of stores near the user can be provided, the service can be utilized by various types of business.

The location-based service is getting popular, but it has been difficult for the location-based service using the current location information to be effectively used in a terminal with less portability like a smart TV.

SUMMARY OF THE INVENTION

Aspects of the present invention are to address at least the above-mentioned problems and/or disadvantages and to provide at least the advantages described below. Accordingly, an aspect of the present invention is to provide a method and apparatus for effectively using a location-based social network service even when using a terminal with less portability by making the location-based social network service available in the same manner as in using the current location information of a portable terminal, using the virtual access location information of a portable terminal even if the portable terminal is not positioned in the real space.

In accordance with an aspect of the present invention, a method for providing a social network service using location information is provided. The method includes receiving at least one content, when the content includes at least one location information, extracting the at least one location information from the content, and providing the social network service using the extracted at least one location information.

In accordance with another aspect of the present invention, an electric device configured to providing a social network service using location information is provided. The electric device includes an input unit configured to generate an input signal of a user command, a display unit configured to display at least one content, a wireless communication unit configured to transmit and receive the content, a storage unit configured to store the received content, a location information acquisition unit configured to receive a signal that is used in determining current location information of the electric device, and a controller configured to receive the at least one content, when the content includes at least one location information, extract the at least one location information from the content, and provide the social network service using the extracted at least one location information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 9 illustrates an example where a location-based social network service using a social network service is actually applied according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
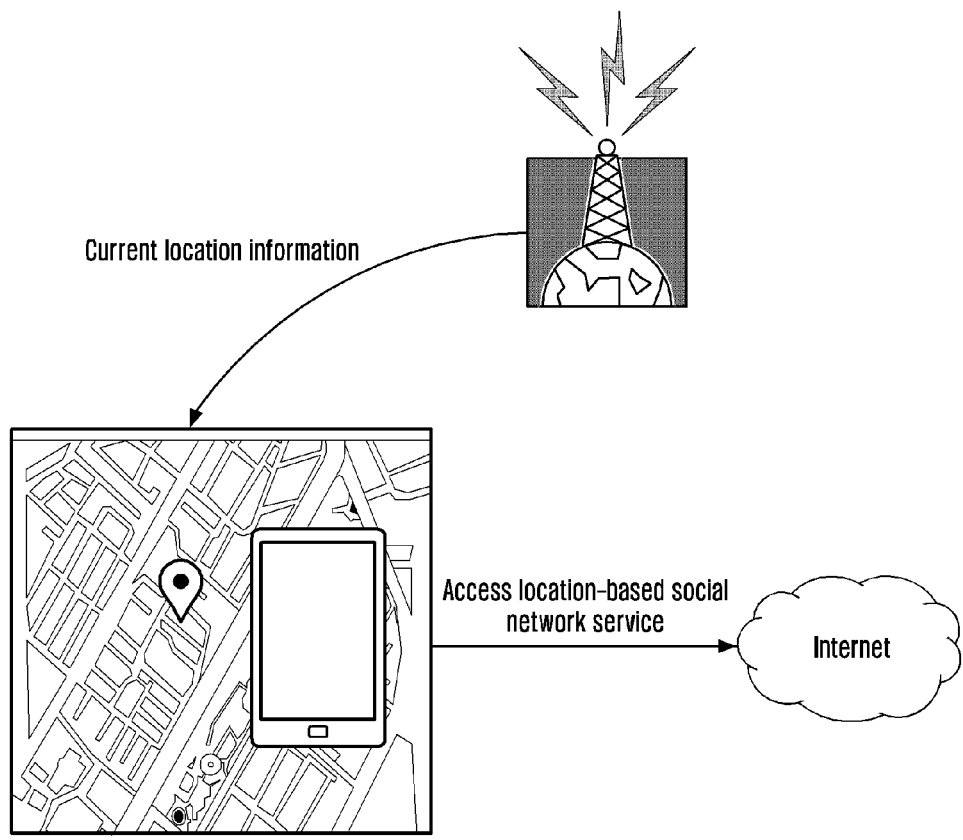
FIG. 1 illustrates a location-based social network service using the current location information according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the exemplary embodiments of the present invention, a location-based social network service is a service where a user's location is recognized using the location-based service, the location is informed to the user's acquaintances through the social network service, and the relation information between the user and the user's acquaintances can be shared.

In the exemplary embodiments of the present invention, location information includes information indicating locations for certain places, and may include latitude information, longitude information, address information, etc.

In the exemplary embodiments of the present invention, virtual access location information includes location information of the actual space corresponding to the virtual access location of a portable terminal used to access a location-based social network service when the user intends to access a location-based social network service in a location which is not the currently positioned location using a portable terminal.

In the exemplary embodiments of the present invention, contents are digital contents containing information, and refer to visually recognizable contents such as digital broadcasts, moving pictures and images, or the like.

In the exemplary embodiments of the present invention, a contents provider is any device that provides contents to a portable terminal, and includes a broadcasting station, another terminal and a server, or the like.

FIGS. 1 through 9, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates a location-based social network service using the current location information according to the related art.

Referring to FIG. 1, a portable terminal accesses a location-based social network service by accessing the Internet through a portable terminal according to the location information of the portable terminal which is obtained through a Global Positioning System (GPS) or a mobile communication network. The existing location-based social network service has generally recognized the current location information of a portable terminal and provided various sets of information related with the surroundings of the location.

The same has been true with location-based social network services, and it has been difficult to effectively use the existing location-based social network service using the current location information in a portable terminal with less portability like a smart TV.

Therefore, exemplary embodiments of the present invention have been designed to address the above problems, and provides a method and apparatus for effectively using a location-based social network service even when using a terminal with less portability by making the location-based social network service available in the same manner as in using the current location information of a portable terminal, using the virtual access location information of a portable terminal even if the portable terminal is not positioned in the real space.

Figure 2:
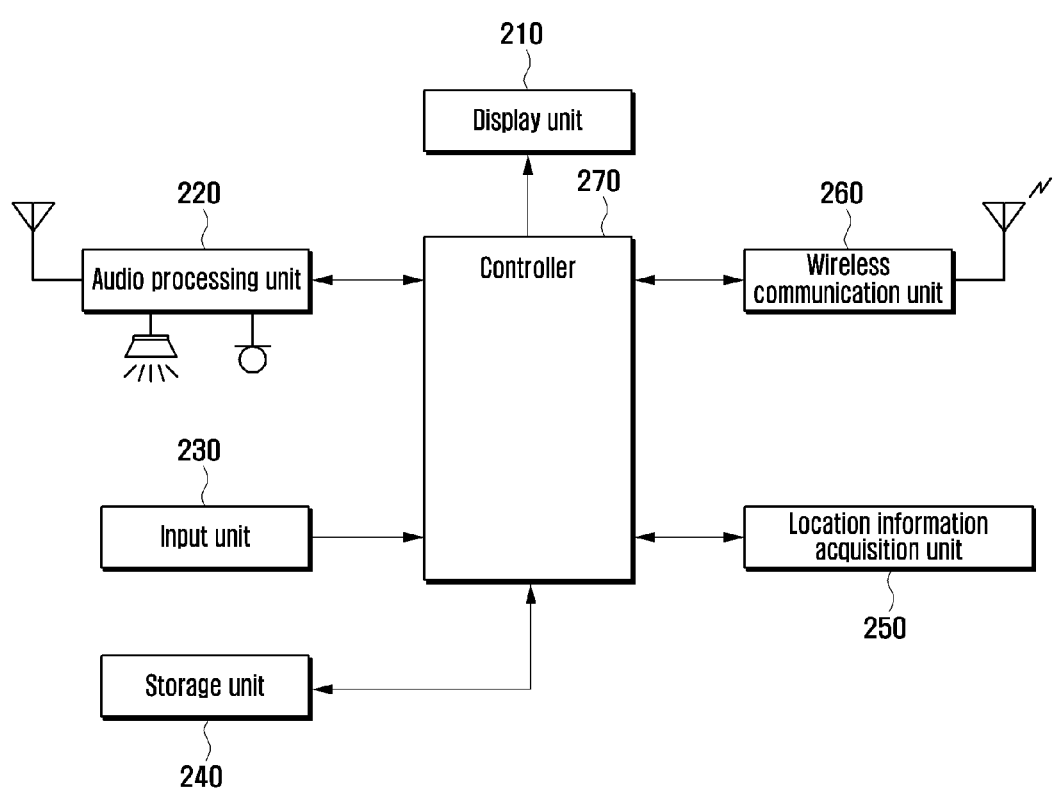
FIG. 2 is a block diagram illustrating the internal constitution of a portable terminal according to an exemplary embodiment of the present invention.

FIG. 2 is a block diagram illustrating the internal constitution of a portable terminal according to an exemplary embodiment of the present invention.

Referring to FIG. 2, a display unit 210 can be formed as a Liquid Crystal Display (LCD), and visually provides menus of a portable terminal 200, inputted data, function setting information and other various sets of information to a user. For example, the display unit 210 displays a booting screen, an idle screen, a calling screen and other application execution screens of the portable terminal.

In the exemplary embodiment of the present invention, the display unit 210 can display the service details when using a location-based social network service. Further, the display unit 210 can display contents replayed when replaying contents which do not include virtual access location information.

An audio processing unit 220 may be formed as a Coder and Decoder (CODEC). The CODEC may include a data CODEC which processes packet data, or the like, and an audio CODEC which processes audio signals such as voice. Hence, when a moving picture is taken, the audio processing unit 220 converts digital audio signals into analog audio signals through the audio CODEC and replays the converted signals as audible sound through a Speaker (SPK), and converts analog audio signals inputted from a Microphone (MIC) into digital audio signals through the audio CODEC.

An input unit 230 receives an input of the user's key manipulation signal for controlling the portable terminal 200, and transmits the signal to a controller 270. The input unit 230 can be formed as a key pad including a number key, a letter key and a direction key such as a 3*4 keyboard and a QWERTY keyboard, or the like, and can be formed as a touch pad. The input unit 230 generates an input signal for executing functions of the portable terminal (a calling function, a moving picture or music replay function, an image display function, a broadcast viewing function, a photographing function, an audio recording function, and a function of executing an application such as a calculator, a schedule planner, or the like) according to the user's input.

The display unit 210 may be provided as a Liquid Crystal Display (LCD). In this case, the display unit 210 may include a controller for controlling the LCD, a video memory in which image data is stored and an LCD element. If the LCD is provided as a touch screen, the display unit 210 may perform a part or all of the functions of the input unit 230.

In the exemplary embodiment of the present invention, the input unit 230 transmits virtual access location information according to the user's input to the controller 270.

A storage unit 240 stores a program and data which are necessary in operating the portable terminal 200, and can be divided into a program area and a data area. The storage unit 240 can be formed as a volatile storage medium or a nonvolatile storage medium, and can also be formed as a combination of the two storage media. A volatile storage medium includes a semiconductor memory such as a Random Access Memory (RAM), Dynamic Random Access Memory (DRAM) and Static Random Access Memory (SRAM), and a nonvolatile storage medium includes a hard disk drive.

In the exemplary embodiment of the present invention, the storage unit 240 can store contents received from a contents provider (not shown).

The location information acquisition unit 250 transmits and receives signals which are necessary in determining the current location information of the portable terminal 200. A representative example of the location information acquisition unit 250 is a GPS module, but the exemplary embodiment of the present invention is not limited to this example. Any device, which can determine the current location information of the portable terminal, can be a location information acquisition unit 250 of the present invention. For example, the location information acquisition unit 250 can be formed as a Bluetooth communication module, an infrared communication module, a Zigbee communication module, a WiFi communication module, and a Radio Frequency Identification (RFID) communication module, etc.

In the exemplary embodiment of the present invention, when the user uses a location-based social network service using the current location, the location information acquisition unit 250 can determine the current location information of the portable terminal 200.

The wireless communication unit 260 transmits and receives corresponding data for wireless communication of a portable terminal 200. The wireless communication unit 260 can comprise a Radio Frequency (RF) transmission unit which up-converts and amplifies the frequency of a transmitted signal, and an RF reception unit which low-noise-amplifies a received signal and down-converts the frequency. Further, the wireless communication unit 260 can receive data through a wireless channel and output the data to the controller 270, and transmit data outputted from the controller 270 through the wireless channel. The wireless communication unit according to an exemplary embodiment of the present invention can transmit and receive a wireless signal for determining the current location information of the portable terminal 200.

According to an exemplary embodiment of the present invention, the location information can be obtained through the wireless communication unit 260 as well as the location information acquisition unit 250. If the wireless communication unit 260 receives wireless signals from at least three base stations and transmits the received signals to the controller 270, the controller 270 can determine the current location information of the portable terminal 200 using time difference of wireless signals received from the at least three base stations. Further, in the case of a portable terminal 200 using a service system which is available only in a certain cell, if the wireless communication unit 260 receives a wireless signal from the base station and transmits the received signal to the controller 270, the controller 270 realizes that the portable terminal 200 is currently positioned in the certain cell, and can roughly determine the current location of the portable terminal 200.

In the exemplary embodiment of the present invention, the wireless communication unit 260 can receive contents through communication with the contents provider.

The controller 270 controls general operation of the portable terminal 200 and a signal flow between internal blocks of the portable terminal 200. The controller 270 according to an exemplary embodiment of the present invention receives the user's location-based social network service operation command, and operates the location-based social network service program.

Further, the controller 270 first determines whether virtual location information is used. When it is determined that the virtual location information is not used, the controller 270 obtains the current location information by controlling the location information acquisition unit 250 or the wireless communication unit 260. The controller 270 accesses the location-based social network service using the current location information obtained by controlling the wireless communication unit 260. When it is determined that the virtual location information is used, the controller 270 obtains the virtual access location information of the portable terminal 200.

Specifically, the controller 270 first determines whether contents are received from a contents provider. When the controller 270 determines that contents are received from a contents provider, the controller 270 controls the wireless communication unit 260 to receive the contents and store the received contents in the storage unit 240. Thereafter, the controller 270 determines whether the received contents include location information.

In the exemplary embodiment of the present invention, location information includes information which indicates the location for a certain place, and can include latitude information, longitude information, address information, etc.

When it is determined that the received contents include location information, the controller 270 extracts at least one set of location information from the contents. The controller 270 selects virtual access location information which is desired to be used when accessing a location-based social network service among the extracted one or more sets of location information, and obtains the selected virtual access location information.

When it is determined that the received contents do not include location information, the controller 270 controls the display unit 210 to replay the contents. The controller 270 extracts an image of a place in which the user desires to access a location-based social network service from the replayed contents. The image can generally be extracted by a method of capturing replayed contents, but various other methods can be used to extract the image. The controller 270 controls the wireless communication unit 260 to search for location information for the extracted image by accessing the Internet, etc., and obtain virtual access location information When it is determined that the controller 270 does not receive contents from the contents provider, the controller 270 receives from the user an input of virtual access location information through the input unit 230, and obtains the virtual access location information.

The controller 270 controls the wireless communication unit 260 using the virtual access location information obtained in various ways, and accesses the location-based social network service. When the user accesses the location-based social network service using the virtual access location information, a portable terminal is positioned in the actual space corresponding to the virtual access location information, and shows the same effect as that shown in the location-based social network service.

However, the location-based social network service provider can check whether the user accesses the location-based social network service using the virtual access location information or whether the user accesses the location-based social network service using the current location information, and can provide different services accordingly. The controller 270 can control to use different services in the location-based social network service accessed through the wireless communication unit 260. An example of different services will be explained later with reference to FIGS. 8 and 9.

Up to now, a portable terminal 200, which can access the location-based social network service using virtual location information without using the current location information even though the portable terminal 200 is not positioned in the actual space, has been explained. Hereinafter, a method for accessing a location-based social network service using the portable terminal 200 will be explained below.

Figure 3:
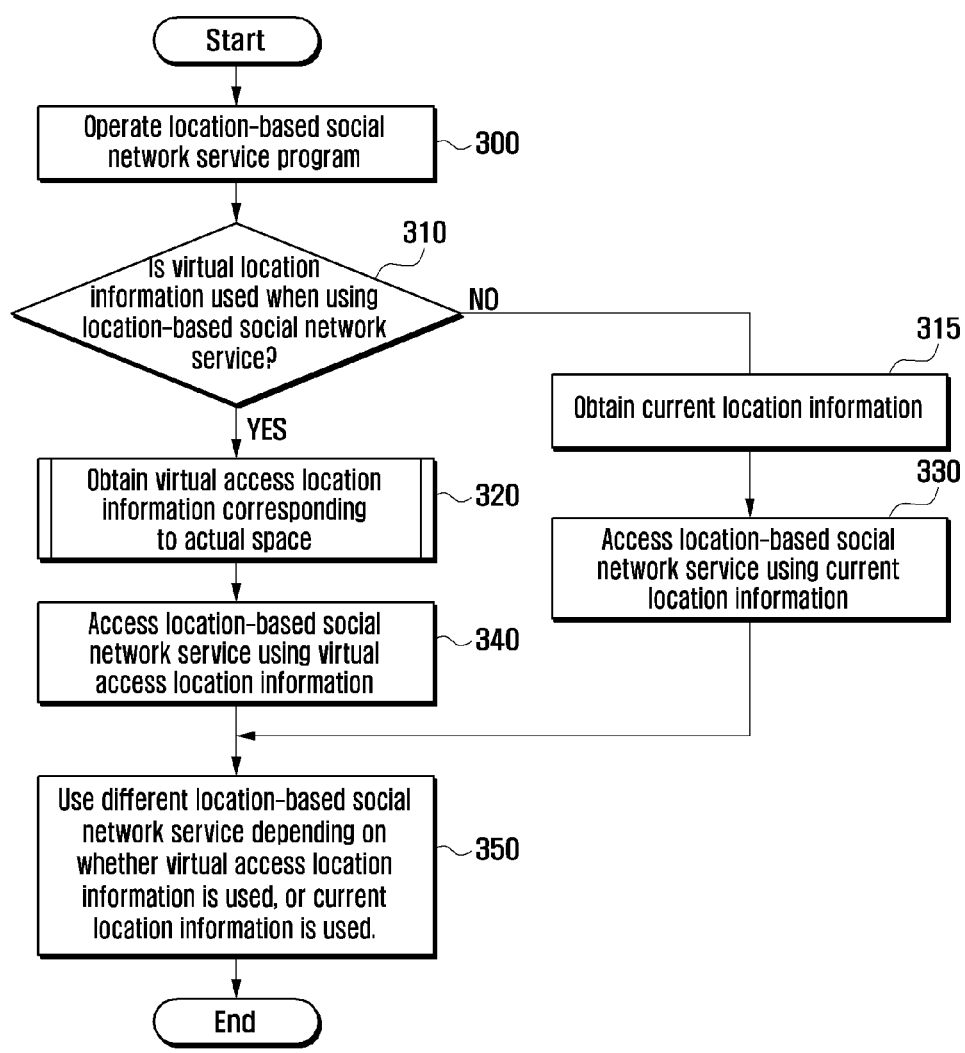
FIG. 3 is a flowchart illustrating a method of accessing a location-based social network service according to an exemplary embodiment of the present invention.

FIG. 3 is a flowchart illustrating a method of accessing a location-based social network service according to an exemplary embodiment of the present invention.

Referring to FIG. 3, the controller 270 receives from a user a location-based social network service operation command through the input unit 230, and operates the location-based social network service in step 300.

The controller 270 determines whether virtual location information is used when using a location-based social network service in step 310. Specifically, after the location-based social network service is operated, the controller 270 controls the display unit 210 to display a message in which the user can select whether to use the virtual location information. The user selects whether the virtual location information is used through the input unit 230, and the controller 270 can determine according to the user's selection command received through the input unit 230.

When it is determined that the virtual location information is not used, the controller 270 controls the acquisition unit 250 or the wireless communication unit 260 to obtain the current location information in step 315. Thereafter, the controller 270 controls the wireless communication unit 260 to access the location-based social network service using the obtained current location information in step 320.

When the controller 270 determines that the virtual location information is used at step 310, the controller 270 obtains the virtual access location information in step 320. An exemplary acquisition process will be explained later with reference to FIG. 4.

The controller 270 controls the wireless communication unit 260 with the virtual access location information obtained in various ways in order to access the location-based social network service in step 340. When the controller 270 accesses the location-based social network service using the virtual access location information, the effect is the same as that when using the location-based social network service as the portable terminal is positioned at the actual space corresponding to the virtual access location information.

However, the location-based social network service provider can confirm whether the user accessed the location-based social network service using the virtual access location information, or using the current location information, and can provide different services accordingly.

The controller 270 can access the location-based social network service, and can control the wireless communication unit 260 to use a different service in the accessed location-based social network service in step 350. Examples of a different service will be explained later with reference to FIGS. 8 and 9.

Figure 4:
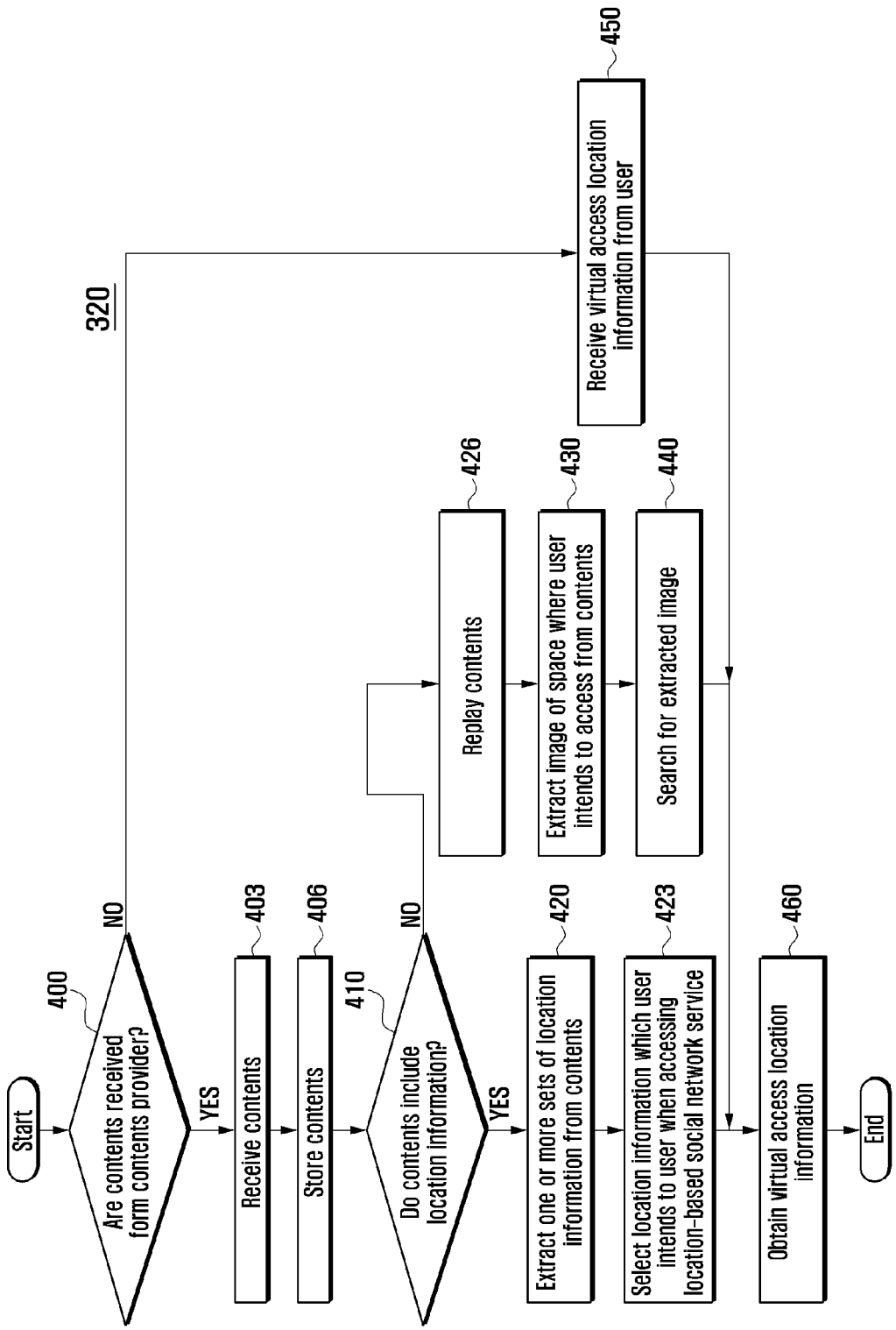
FIG. 4 is a flowchart illustrating a method of obtaining virtual access location information according to an exemplary embodiment of the present invention.

FIG. 4 is a flowchart illustrating a method of obtaining virtual access location information according to an exemplary embodiment of the present invention.

Referring to FIG. 4, the controller 270 determines whether contents have been received from a contents provider in step 400. Specifically, the controller 270 controls the display unit 210 to display a message in which the user can select whether to receive contents from the contents provider. The user can select whether to receive the contents through the input unit 230, and the controller 270 can determine according to the user's selection command received through the input unit 230.

When the controller 270 determines that contents are received from the contents provider, the controller 270 controls the wireless communication unit 260 to receive contents from the contents provider in step 403. When the reception is completed, the controller 270 controls to store the received contents in the storage unit 240 in step 406.

Thereafter, the controller 270 determines whether the received contents include location information in step 410.

In the exemplary embodiment of the present invention, location information includes information indicating locations for certain places, and may include latitude information, longitude information, and address information, etc.

When the controller 270 determines that the received contents include location information, the controller 270 extracts at least one set of location information from the received contents in step 420. Then the controller 270 selects location information which is intended to be used when accessing the location-based social network service from the extracted one or more sets of location information in step 423, and obtains the virtual access location information in step 460.

When it is determined that the received contents do not include location information, the controller 270 controls the display unit 210 to replay contents in step 426.

When replaying the contents, the controller 270 extracts an image of a place where the user desires to access the location-based social network service from the replayed contents in step 430. The image can generally be extracted by a method of capturing replayed contents, but various other methods can be used to extract the image.

The controller 270 controls the wireless communication unit 260 to search for location information for the extracted image by accessing the Internet, etc. in step 440, and obtains the virtual access location information from the search result in step 460.

When it is determined that the contents are not received from the contents provider in step 400, the controller 270 receives an input of the virtual access location information through the input unit 230 from the user in step 450, and obtains the virtual location information based on the inputted information in step 460. Specifically, the controller 270 can control the display unit 210 to display an input window for inputting location information. The input window can include an input window for inputting latitude information, longitude information or address information.

Figure 5:
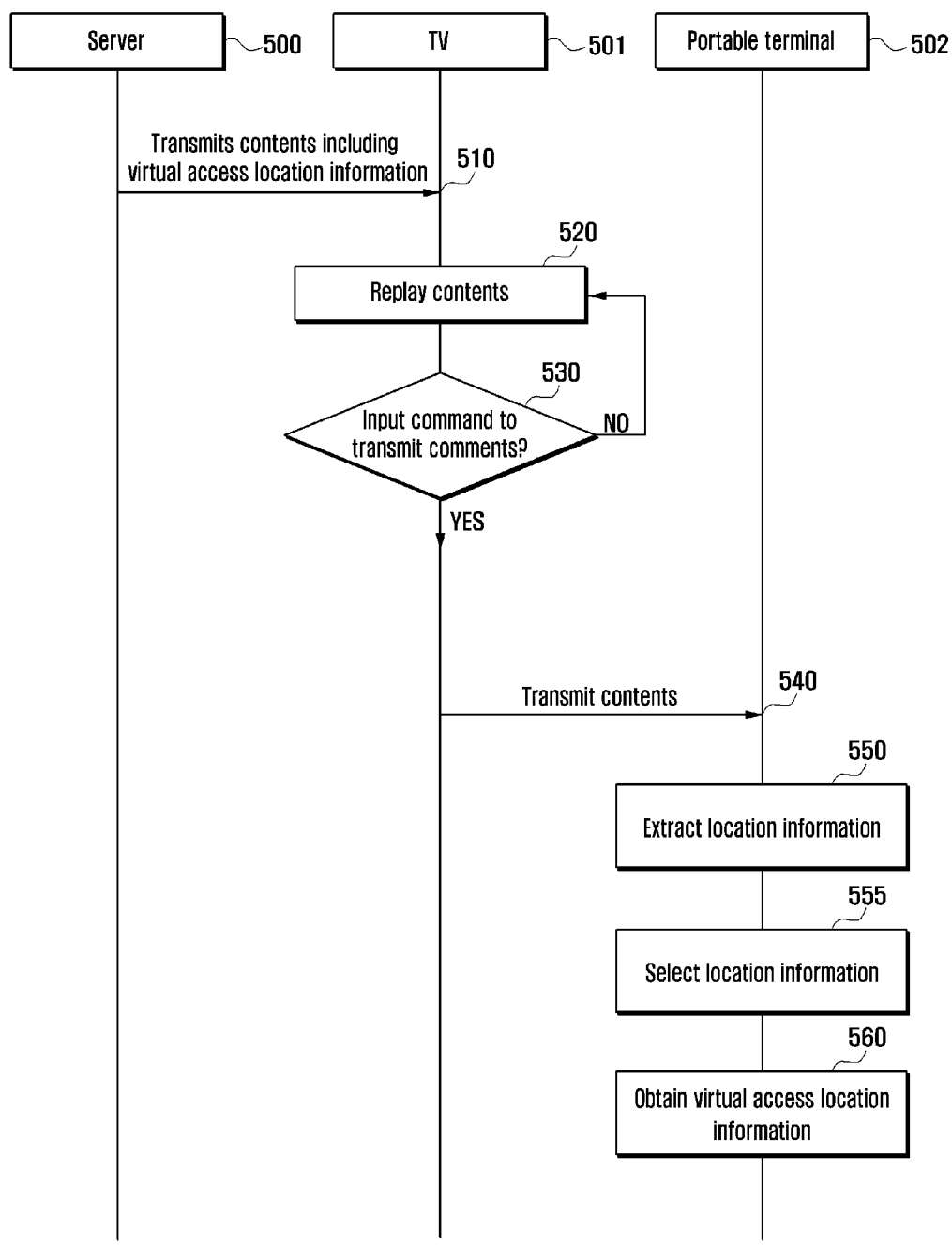
FIG. 5 is a flowchart illustrating a method of accessing a location-based social network service according to an exemplary embodiment of the present invention.

FIG. 5 is a flowchart illustrating a method of accessing a location-based social network service according to an exemplary embodiment of the present invention. The present exemplary embodiment is the case where contents including virtual access location information are received from a contents provider.

Referring to FIG. 5, a TV 501 receives contents including location information transmitted from the server 500 in step 510. The contents transmission process is not limited to transmission from the server 500. The contents can be received from various contents providers. For example, digital broadcasts can be received from a broadcasting station. Further, a terminal, which receives contents, can be various terminals such as a mobile phone, a notebook computer, a Portable Media Player (PMP), etc., which can transmit and receive data, as well as a TV 501.

The TV 501 determines whether there is a command to transmit comments while contents are replayed in step 530. If a user finds a place where the user desires to access using the location information based service, the user gives a command to transmit contents. When the TV 501 determines that there is an input of a command to transmit contents, the TV 501 transmits the contents to a portable terminal 502 in step 540. When it is determined that there is no input of a command to transmit the contents, the contents are continually replayed in step 520.

The portable terminal 502 extracts location information from the contents transmitted from the TV in step 550, selects the location information in step 555, and obtains virtual access location information in step 560.

Figure 6:
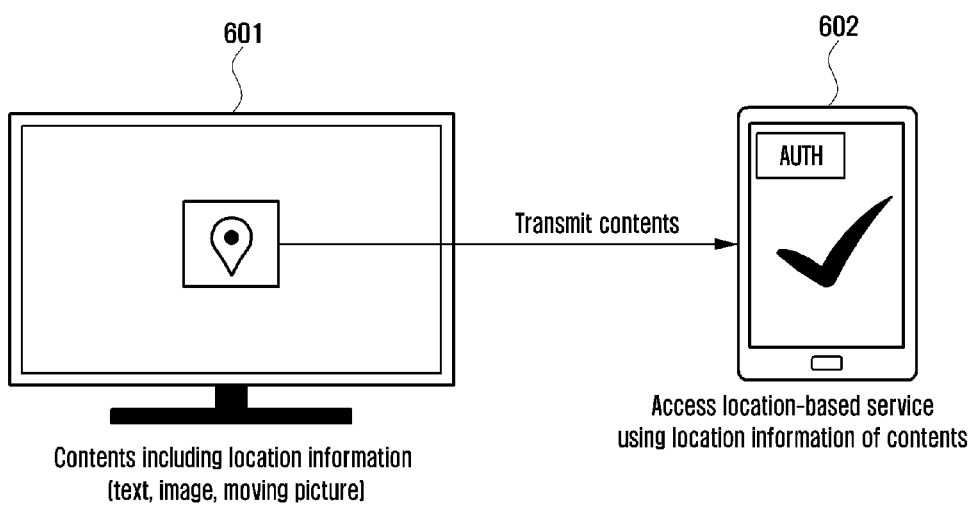
FIG. 6 illustrates a method of accessing a social network service according to an exemplary embodiment of the present invention.

FIG. 6 illustrates a method of accessing a social network service according to an exemplary embodiment of the present invention.

Referring to FIG. 6, an exemplary embodiment is explained with reference to FIG. 5. If a TV 601 transmits contents including location information to a portable terminal 602, a user accesses the location-based social network service using location information of contents in the portable terminal 602.

Figure 7:
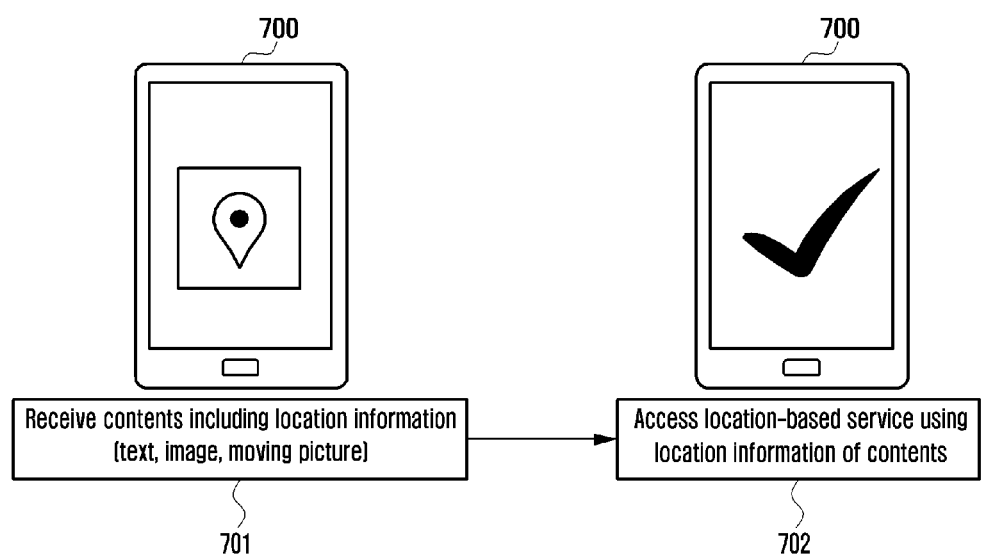
FIG. 7 illustrates a method of accessing a social network service according to another exemplary embodiment of the present invention.

FIG. 7 illustrates a method of accessing a social network service according to another exemplary embodiment of the present invention.

Referring to FIG. 7, and unlike the case in FIG. 6, a portable terminal 700 directly receives contents including location information from a contents provider in step 701. The portable terminal 700 then accesses the location-based social network service using location information of the directly received contents in step 702.

Figure 8:
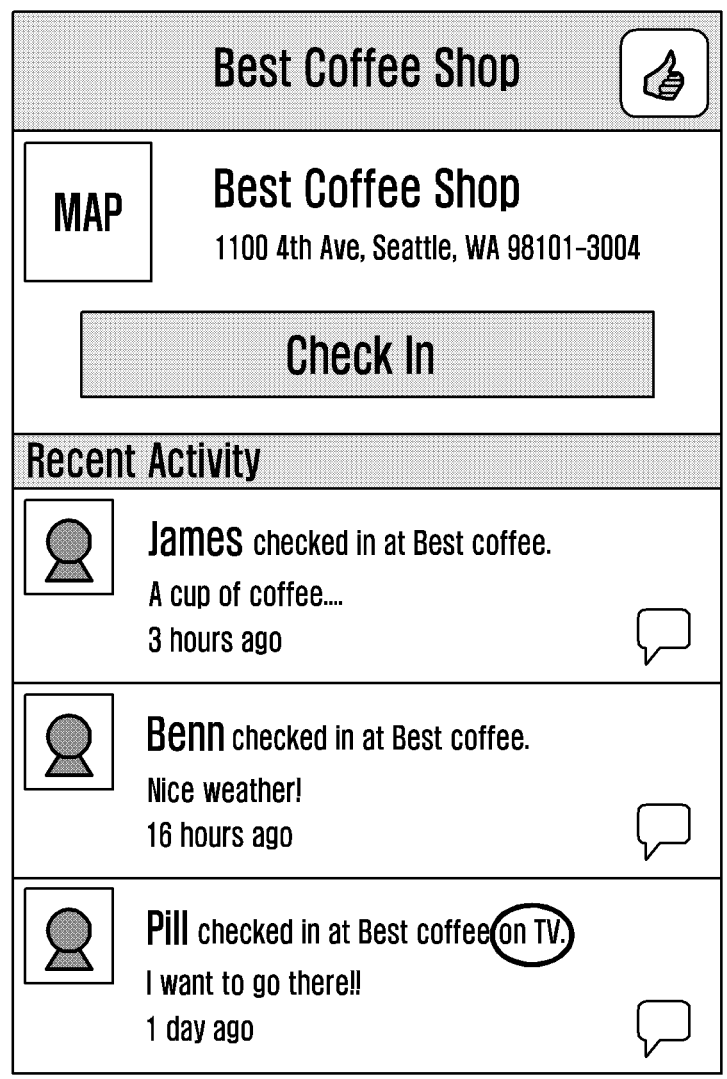
FIG. 8 illustrates an example where a location-based social network service using a social network service is actually applied according to an exemplary embodiment of the present invention.

FIG. 8 illustrates a location-based social network service using a social network service according to an exemplary embodiment of the present invention.

Referring to FIG. 8, the case where a user accesses a location-based social network service using the social network service using virtual location can be different from the case where the user accesses using the current location in terms of the access route. For example, users James, Benn and Pill have accessed the social networking service of Best Coffee Shop, a coffee shop, using the location-based social network service.

It is seen that the users James and Benn have used the location-based social network service using the current location information because there is no more indication after they checked in the Best Coffee, and in the case of Pill, it is written "Checked in at Best Coffee on TV". That is, it shows that Pill received contents including location of Best Coffee Shop from TV, transmitted the contents to the portable terminal, and accessed by extracting the location information from the portable terminal.

FIG. 9 illustrates a location-based social network service using a social network service according to an exemplary embodiment of the present invention.

Referring to FIG. 9, the method of using a location-based social network service using the social network service according to the exemplary embodiment of the present invention will be explained with reference to FIG. 9. The case where a user accesses the location-based social network service using virtual access location information in FIG. 8 can be distinguished from the case of accessing using the current location information with the display of "on TV". As such, available services can be changed. As shown in FIG. 9, if the user accesses the location-based social network service using the virtual access location information, the portable terminal of the user can receive a suggestion message from a service provider that free coffee will be provided if the user actually visits a café. If the user actually visits the café with the portable terminal containing the received suggestion message and accesses the location-based social network service using the current location information, a free coffee coupon can be transmitted to the portable terminal. Therefore, it is possible to use a service which is different from the service in the case where the user accesses the location-based social network service using only the current location information.

According to the exemplary embodiment of the present invention, it is possible to provide a method and apparatus for effectively using a location-based social network service even when using a terminal with less portability by making the location-based social network service available in the same manner as in using the current location information of a portable terminal, using the virtual access location information of a portable terminal even if the portable terminal is not positioned in the real space.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method comprising:
   determining whether to receive one or more pieces of contents from an external electronic device;
   if determined to receive one or more pieces of contents from the external electronic device, obtaining information of at least one first location as location information desired for use with an online service from received one or more pieces of contents;
   if determined not to receive one or more pieces of contents from the external electronic device, obtaining information of at least one second location as the location information desired for use with the online service from a user input; and
   providing, via a display operatively coupled with an electronic device, at least a part of the online service based at least in part on the location information,
   wherein the obtaining of the information of the at least one first location comprises:
      if the information of at least one first location is not included in the received one or more pieces of contents, receiving information of one or more locations by searching the Internet using visual information of one or more actual places obtained from one or more pieces of contents that are accessible by a user; and
      selecting information of at least one third location as the location information, from the information of the one or more locations.

2. The method of claim 1, wherein the location information comprises at least one of latitude information, longitude information, address information, or information indicating locations for one or more actual places.

3. The method of claim 1, wherein the obtaining of the information of the at least one first location comprises:
   determining whether one or more pieces of contents from which to extract information of one or more locations are accessible by a user.

4. The method of claim 3, wherein the one or more pieces of contents comprises:
   at least one of visually recognizable digital broadcast contents, a moving picture or an image.

5. The method of claim 3, wherein the one or more pieces of contents are provided by another electronic device.

6. The method of claim 1, wherein the providing comprises:
   indicating that the at least part of the online service is provided based at least in part on the location information.

7. The method of claim 6, wherein the indicating comprises:
   displaying information associated with an actual place corresponding to the location information, or displaying information of another electronic device through which the location information was provided.

8. The method of claim 1, wherein the providing comprises providing one or more types of information based at least in part on the location information.

9. The method of claim 1, wherein the providing comprises:
   providing at least one of information of an actual place associated with the location information, an electronic document including text or image, a check-in result page, a comment from one or more acquaintances, a history list of mutual communication or commercial suggestion information.

10. An apparatus comprising:
    a display to present service information; and
    a processor operatively coupled with the display, the processor configured to:
       determine whether to receive one or more pieces of contents from an external electronic device,
       if determined to receive one or more pieces of contents from the external electronic device, obtain information of at least first location as location information desired for use with an online service from received one or more pieces of contents,
       if determined not to receive one or more pieces of contents from the external electronic device, obtain information of at least one second location as location information from a user input, and
       provide, via the display, at least a part of the online service based at least in part on the location information,
    wherein the processor is further configured to:
       if the information of the at least one first location is not included in the received one or more pieces of contents, receive information of one or more locations by searching Internet using visual information of one or more actual places obtained from one or more pieces of contents that are accessible by a user; and select information of at least one third location as the location information, from the information of the one or more locations.

11. The apparatus of claim 10, wherein the processor is further configured to:

determine whether one or more pieces of contents from which to extract information of one or more locations are accessible by a user.

12. A non-transitory machine-readable storage medium storing instructions that, in response to being executed by one or more processors, cause the one or more processors to perform operations comprising:

determining whether to receive one or more pieces of contents from an external electronic device;

if determined to receive one or more pieces of contents from the external electronic device, obtaining information of at least one first location as location information desired for use with an online service from received one or more pieces of contents;

if determined not to receive one or more pieces of contents from the external electronic device, obtaining information of at least one second location as the location information from a user input; and presenting the online service to a user, the online service being received based at least in part on the location information, wherein the obtaining information of at least one first location comprises:

if the information of at least one first location is not included in the received one or more pieces of contents, receiving information of one or more locations by searching the Internet using visual information of one or more actual places obtained from one or more pieces of contents that are accessible by a user; and selecting information of at least one third location as the location information, from the information of the one or more locations.

\* \* \* \* \*